H. H. PETTY.
COMBINATION FISH AND BAIT BUCKET.
APPLICATION FILED JULY 16, 1920.
1,385,792.                                                Patented July 26, 1921.
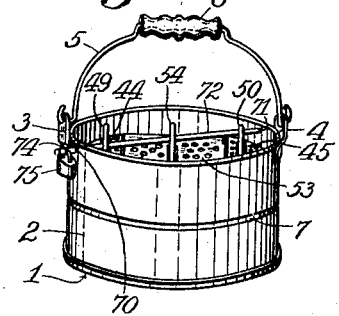
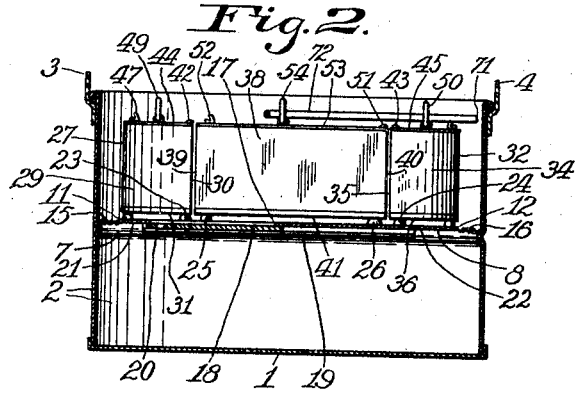
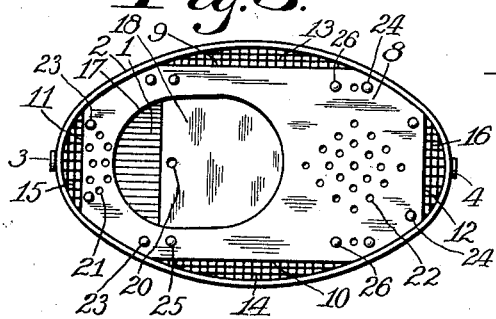
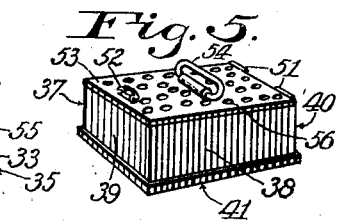
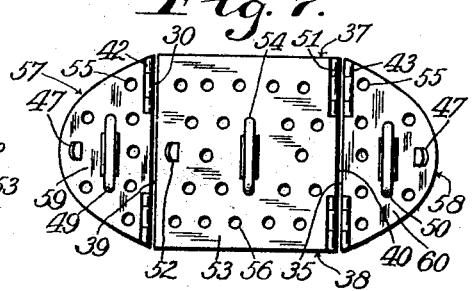
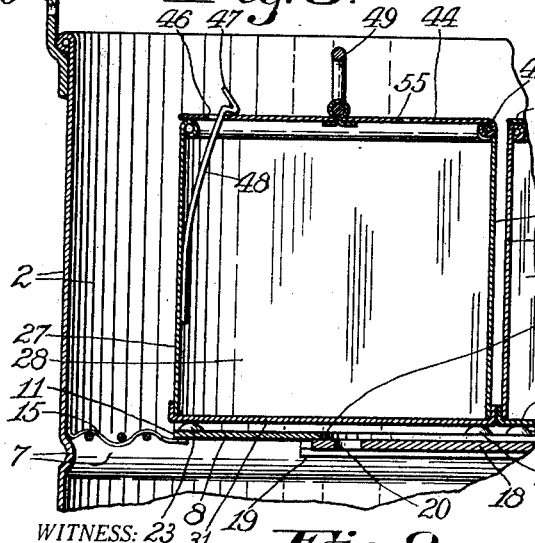
WITNESS:
Robert Liebrich,
R. H. Sample
INVENTOR:
Herbert H. Petty,
BY
E. D. Silvius,
ATTORNEY.

UNITED STATES PATENT OFFICE.

HERBERT H. PETTY, OF INDIANAPOLIS, INDIANA.

COMBINATION FISH AND BAIT BUCKET.

1,385,792.   Specification of Letters Patent.   Patented July 26, 1921.

Application filed July 16, 1920. Serial No. 396,733.

*To all whom it may concern:*

Be it known that I, HERBERT H. PETTY, a citizen of the United States, residing at Indianapolis, in the county of Marion and State of Indiana, have invented new and useful Combination Fish and Bait Buckets, of which the following is a specification, reference being had to the accompanying drawings and to the letters and figures of reference marked thereon.

This invention relates to the type of bucket or pail that is used by sportsmen, especially fishermen or anglers who fish with hook and line requiring bait, the invention having reference particularly to a combination bucket in which both fish and different kinds of bait may be carried alive or in fresh condition.

An object of the invention is to provide an improved bucket which shall be so constructed as to be adapted for compactly carrying fish and also different kinds of bait, and particularly so that the fish shall be in water and permit the bucket to be hauled in a vehicle or carried without causing the water to splash out of the bucket, while insuring ventilation of the interior of the bucket.

Another object is to provide an improved fish bucket of such construction as to contain a separate removable pail or a plurality of pails adapted to securely contain bait, and permit the pail to be carried away to obtain a supply of bait from distant points.

A still further object is to provide an improved fish and bait bucket which shall have a plurality of compartments of which one or more may be used to carry bait and in which fish may be carried and locked therein when the supply of bait has become exhausted or a particular kind of bait is not needed, which bucket shall be so constructed as to permit change of compartments in the bucket as may be desired, and which shall be so constructed as to be very practical, durable and economical in use.

With the above-mentioned and other objects in view, the invention consists in a combination fish and bait bucket of novel construction so as to be thoroughly ventilated, and differently shaped pails of such design as to be interchangeable and compactly arranged in the bucket; and, the invention consists also further in means for locking the pails in the bucket, and in the parts and combinations and arrangements of parts as hereinafter particularly described and further set forth in the appended claims.

Referring to the drawings,—Figure 1 is a perspective view of the improved fish and bait bucket as preferably constructed; Fig. 2 is a vertical central section longitudinally of the bucket or principal part thereof in which pails of the preferred form are shown in elevation; Fig. 3 is a top plan of the bucket or principal part; Fig. 4 is a perspective view of one of the two end pails designed for carrying bait; Fig. 5 is a perspective view of the main one of the bait pails; Fig. 6 is a fragmentary vertical longitudinal section of the bucket and compartment pails on an enlarged scale; Fig. 7 is a top plan of the bait pails in assembled order, the end pails being slightly modified so as to have the maximum capacity; Fig. 8 is a top plan of a single pail designed to take the place of three separate pails when desired; and Fig. 9 is a perspective view of a locking bar for securing the pail or pails in the bucket or principal part thereof.

In the different figures of the drawings similar reference characters indicate corresponding elements or features of construction herein referred to in detail.

The combination bucket as preferably constructed is composed principally of suitable sheet metal designed to withstand the action of water. The principal receptacle or part of the bucket has a bottom 1 and a side wall 2 on the bottom, the bottom being oval and the contour of the side wall also being oval in plan, and the end portions of the side wall are provided with ears 3 and 4 to which a bail 5 is connected which has a central handle 6. The bail is sufficiently large to permit it to be swung down over the side of the receptacle. The main part essentially has an improved horizontal partition or floor, the wall 2 preferably having a horizontal rib 7 on the inner side thereof on which a novel floor 8 is supported and secured. The floor has two longitudinal straight edges 9 and 10, so that the floor shall not extend to the adjacent curved side portions of the wall but shall permit ventilation of the compartment under the floor; and preferably the floor has two shorter straight end edges 11 and 12 further permitting ventilation of the lower compartment.

Screens 13 and 14 are connected with the floor edges 9 and 10 respectively and with the adjacent portions of the side wall, and smaller screens 15 and 16 are connected with the end edges 11 and 12 respectively and with the adjacent end portions of the wall. The remaining edge portions of the floor between the straight edges are curved to conform to the curvature of the side wall 2 and are secured to the wall. The floor is supported on the rib 7 and preferably is soldered to the wall, and it has an aperture 17 therein which is preferably arranged relatively near to one end portion of the wall through which to insert or remove fish which may be carried in water in the lower portion of the receptacle. The under side of the floor is provided with a slide door 18 supported on guides 19 secured to the under side of the floor, the door having a finger-hole 20 therein to facilitate operation of the door. Preferably the floor has a series of perforations 21 adjacent to one end and other perforations 22 adjacent to the opposite end thereof; and the floor preferably has also a series of studs 23 in proximity to one end thereof to support one end pail or vessel above the floor, and similar studs 24 in proximity to the opposite end thereof to support the opposite end pail, and the floor has also other studs 25 and 26 to support the main or middle one of the pails. Each end pail is interchangeable with the other or with one of slightly modified form. As preferably constructed one end pail or vessel comprises a short end wall portion 27 approximately as long as the edge 11 of the floor, and two curved portions 28 and 29 connected to the end portion, and a longer wall portion 30 approximately as long as the maximum width of the floor and connected to the curved portions, there being a bottom 31 connected to the several wall portions. The opposite end pail comprises similarly a short end wall portion 32, curved wall portions 33 and 34, and a back portion 35 and a bottom 36. One end pail is removably supported on the studs 23 and the other on the studs 24 to permit circulation of air through the perforations in the floor, while air is permitted to pass through the screens 15 and 16 and past the short end wall portions of the pails. The middle or main pail or vessel is rectangular in plan, being approximately as broad as the maximum width of the floor and of suitable length to approximately fill the space between the two end pails or receptacles, and it comprises two straight sides 37 and 38 and two ends 39 and 40, and a bottom 41 which is removably supported upon the studs 25 and 26, the bottom nearly covering the door-way aperture 17 and also some of the perforations 22.

One of the end pails has hinges 42 and the opposite end pail has hinges 43 at the top of the back wall portions thereof, to which covers 44 and 45 are connected respectively, each cover being of suitable shape in plan to fit or conform to the side walls of the pail. Each cover has an opening 46 to receive a catch or spring-latch 47 which has a shank 48 secured to the inner side of the wall portion of the pail, the catch being adapted to engage the top of the cover to detachably secure it in place and enable it to lift the pail, the covers being provided with handles 49 and 50 respectively, whereby to carry the pails. The main or middle receptacle has hinges 51 and also a catch 52 similar to the catch 47, and a cover 53 which is rectangular in plan and is connected to the hinges and secured by the catch, and is provided with a handle 54. The covers 44 and 45 have each a series of ventilating perforations 55 and the cover 53 has similar perforations 56.

In some cases when ventilation is not needed through the screens 15 and 16, or in case the maximum capacity in the end pails is desired, the end pails would not have the straight end wall portions 27 and 32 respectively, but have elliptically-curved wall portions 57 and 58 respectively to conform to the curvature of the wall portion 2, as indicated in Fig. 7, and have covers 59 and 60 respectively that have curved edges to conform to the curvature of the wall portions, such covers being hinged and latched and provided with handles as above described, and having also the ventilating perforations.

In other cases it may be preferred to use one pail or vessel instead of the three pails above described, in which case the single pail has two straight side portions 61 and 62 and elliptically-curved end portions 63 and 64, the end portions having suitable covers 65 and 66 fixed thereto and provided with ventilating perforations. One of the straight side portions is provided with hinges 67 and the opposite one is provided with a catch 68 similar to the catch 47, and a rectangular cover 69 is connected to the hinges and secured by the catch, the cover being provided with a handle 54 and the ventilating perforation 56, as shown in Fig. 8, the cover 69 occupying the space between the fixed covers 65 and 66.

For the purpose of preventing pilfering, the upper portion of the side wall 2 of the bucket has apertures 70 and 71 therein adjacent to the ears 3 and 4 respectively, and a suitable device, such as a locking bar 72 is inserted through the apertures and has a head 73 on one end thereof and an eye 74 adjacent to the opposite end thereof in which a padlock 75 is secured, the device 72 preferably extending through the cover handles of the pails or vessels, and being arranged so as to extend across all the covers, effectually preventing the removal of the pails from the bucket or principal part.

In practical use the improved bucket may be carried by its bail or hauled in an automobile or other vehicle while carrying suitable fishing bait, different kinds in the several pails which may contain either water of soft earth as may be required by the bait. When starting on a fishing trip, lunch or various articles may be carried in the lower portion or fish compartment of the bucket and later removed when the space may be needed for fish. In case one or more kinds of bait becomes exhausted the pails may be readily removed and carried to a place where a new supply of bait may be obtained, or the pails may be placed in water if desired. In case the fish compartment becomes filled with fish and more carrying space is needed, the bait pails are available for carrying home the larger number of fish. The fish may be readily placed in the lower compartment or removed therefrom after shifting the door 18 so as to open the door-way, the door being closed to prevent escape of the fishes. When the improved bucket is carried or hauled the incidental jolting may cause agitation of the water, but the screens comprising portions of the partition or floor prevent the water from splashing out of the top of the bucket.

Having thus described the invention, what is claimed as new is—

1. A combination fish and bait bucket provided with a floor above the bottom thereof having reticulate portions, and a vessel supported upon the floor between the reticulate portions thereof and having a cover provided with a handle to carry the vessel.

2. A combination fish and bait bucket having a lower compartment and an upper compartment and a controlled passageway and also ventilating openings between the compartments, the upper compartment having a removable pail supported between the ventilating openings, and a bail connected to the bucket at the ends of the upper compartment.

3. A combination fish and bait bucket having a floor above the bottom thereof provided with ventilating openings in two separate portions thereof, the floor having also a controlled passageway therein, and a vessel removably supported on the floor between the ventilating openings, the vessel being provided with a cover having a handle to carry the vessel.

4. A combination fish and bait bucket having a floor above the bottom thereof, the floor being provided with a ventilating opening and also a door-way, a door movably connected with the floor to close the door-way, and a vessel removably supported upon the floor but not covering the ventilator opening, the vessel having a cover provided with a handle to carry the vessel.

5. A combination fish and bait bucket comprising a side wall and also a floor having perforations and a door-way provided with a door, the floor having also ventilating openings adjacent to the side wall, a bail connected to the side wall of the bucket and a ventilated vessel supported upon the floor and having portions adjacent to said side wall adapted to clear the ventilating openings.

6. A combination fish and bait bucket comprising a side wall that is oval in plan, the side wall having a floor secured thereto that has opposite straight edge portions terminating at a distance from the side wall to provide ventilating openings, and a vessel supported upon the floor and having straight sides to leave clear space above the ventilating openings and between the vessel and the adjacent curved portions of the bucket wall.

7. A combination fish and bait bucket comprising a bottom and a side wall that are oval in plan, a perforated floor secured to the side wall and having a door-way provided with a door and having reticulate portions adjacent to said wall, a bail connected to said wall, two end pails arranged upon the floor with studs between the floor and the pail bottoms, each end pail having a hinged and latched perforate cover provided with a handle, and a main pail that is rectangular in plan and arranged upon the floor with studs between the floor and the pail bottom, the main pail being between the end pails and between the reticulate portions of the bottom and having a hinged and latched cover provided with a handle to carry the pail.

In testimony whereof I affix my signature in presence of two witnesses.

HERBERT H. PETTY.

Witnesses:
E. T. SILVIUS,
R. H. SAMPLE.